United States Patent [19]

Risner

[11] Patent Number: 4,480,719

[45] Date of Patent: Nov. 6, 1984

[54] LIFT PLATFORM RETAINER

[75] Inventor: Melvin G. Risner, Carey, Ohio

[73] Assignee: REB Manufacturing, Inc., Carey, Ohio

[21] Appl. No.: 408,801

[22] Filed: Aug. 17, 1982

[51] Int. Cl.[3] .......... B60S 13/00

[52] U.S. Cl. .......... 187/8.52; 254/93 L

[58] Field of Search .......... 187/8.52, 8.47, 8.41, 187/8.75, 8.65, 9 R; 254/2 R, 2 C, 2 B, 89 R, 932; 414/921

[56] References Cited

U.S. PATENT DOCUMENTS

| | | | |
|---|---|---|---|
| 1,936,107 | 11/1933 | Cunneen | 254/89 |
| 1,938,446 | 12/1933 | Bacher | 254/89 |
| 1,952,906 | 3/1934 | Bristol | 254/89 |
| 1,955,586 | 4/1934 | Hott et al. | 254/89 |
| 1,966,975 | 7/1934 | Clapp | 254/89 |
| 2,066,916 | 1/1937 | Thompson | 254/89 |
| 2,098,376 | 11/1937 | Cunneen | 254/89 |
| 2,222,111 | 11/1940 | McCarthy | 254/89 |
| 2,285,989 | 6/1942 | Kroll | 254/89 |
| 2,569,982 | 10/1951 | Estel, Jr. | 254/89 |
| 3,252,544 | 5/1966 | Lill | 187/8.52 |
| 3,458,013 | 7/1969 | Haynes | 187/8.67 |
| 3,532,185 | 10/1970 | Sherry | 187/8.74 |
| 4,005,788 | 2/1977 | Ratliff | 214/77 P |
| 4,095,704 | 6/1978 | Ratliff | 214/77 P |
| 4,124,130 | 11/1978 | Rohrs et al. | 214/75 R |
| 4,140,230 | 2/1979 | Pearson | 214/77 R |

*Primary Examiner*—Joseph J. Rolla
*Assistant Examiner*—Kenneth Noland
*Attorney, Agent, or Firm*—Hugh Adam Kirk

[57] ABSTRACT

A hinged retainer barrier along an edge of a lift platform which normally is in its barrier position urged by a spring around the pivot of a secondary lever through links between the lever and the hinged barrier, which barrier is moved against the action of spring into its non-barrier position flat against the surface of the platform when the secondary lever engages the ground.

12 Claims, 6 Drawing Figures

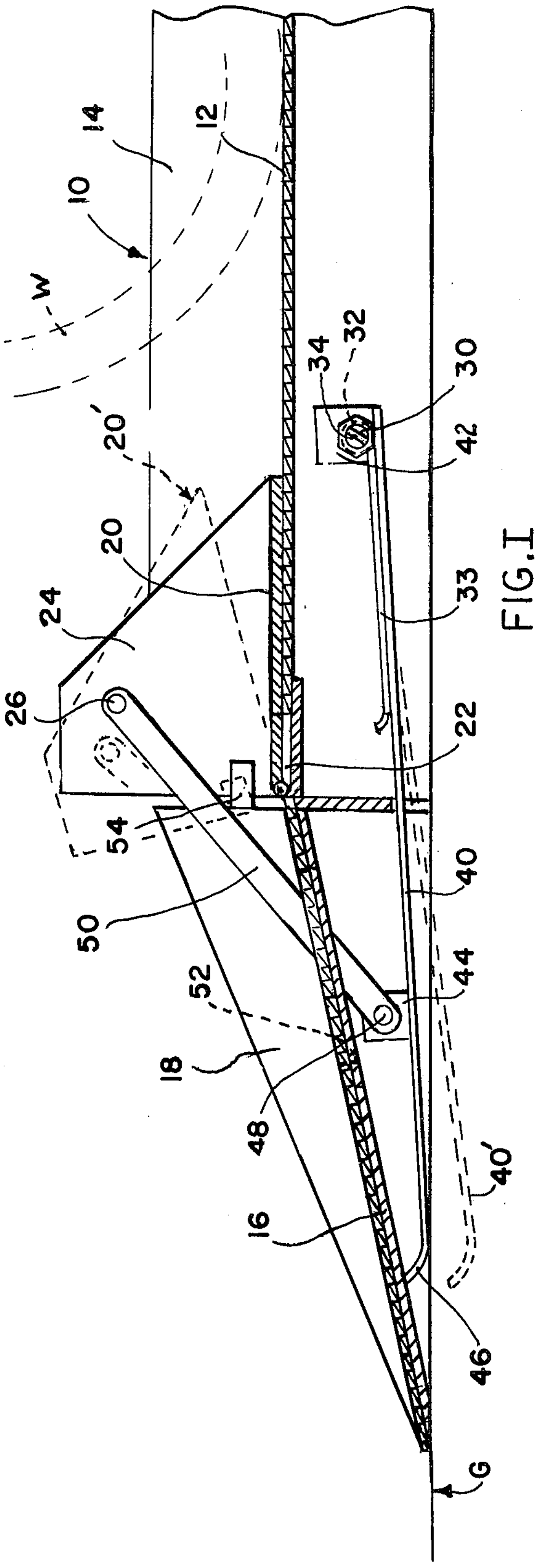
FIG. I
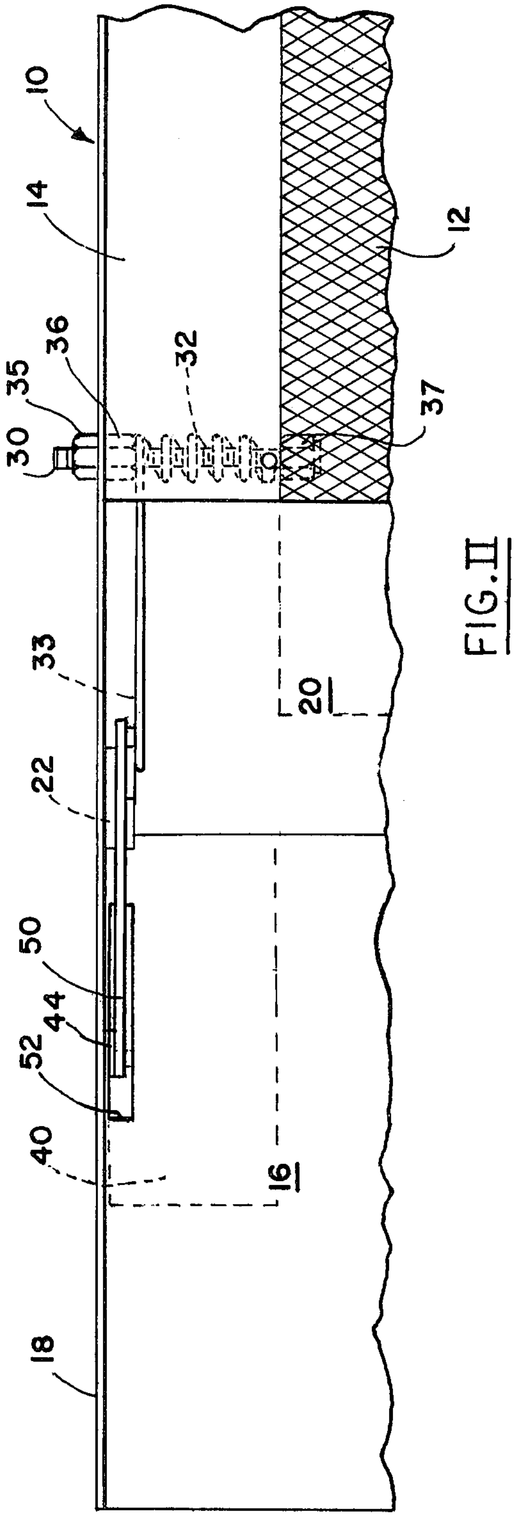
FIG. II

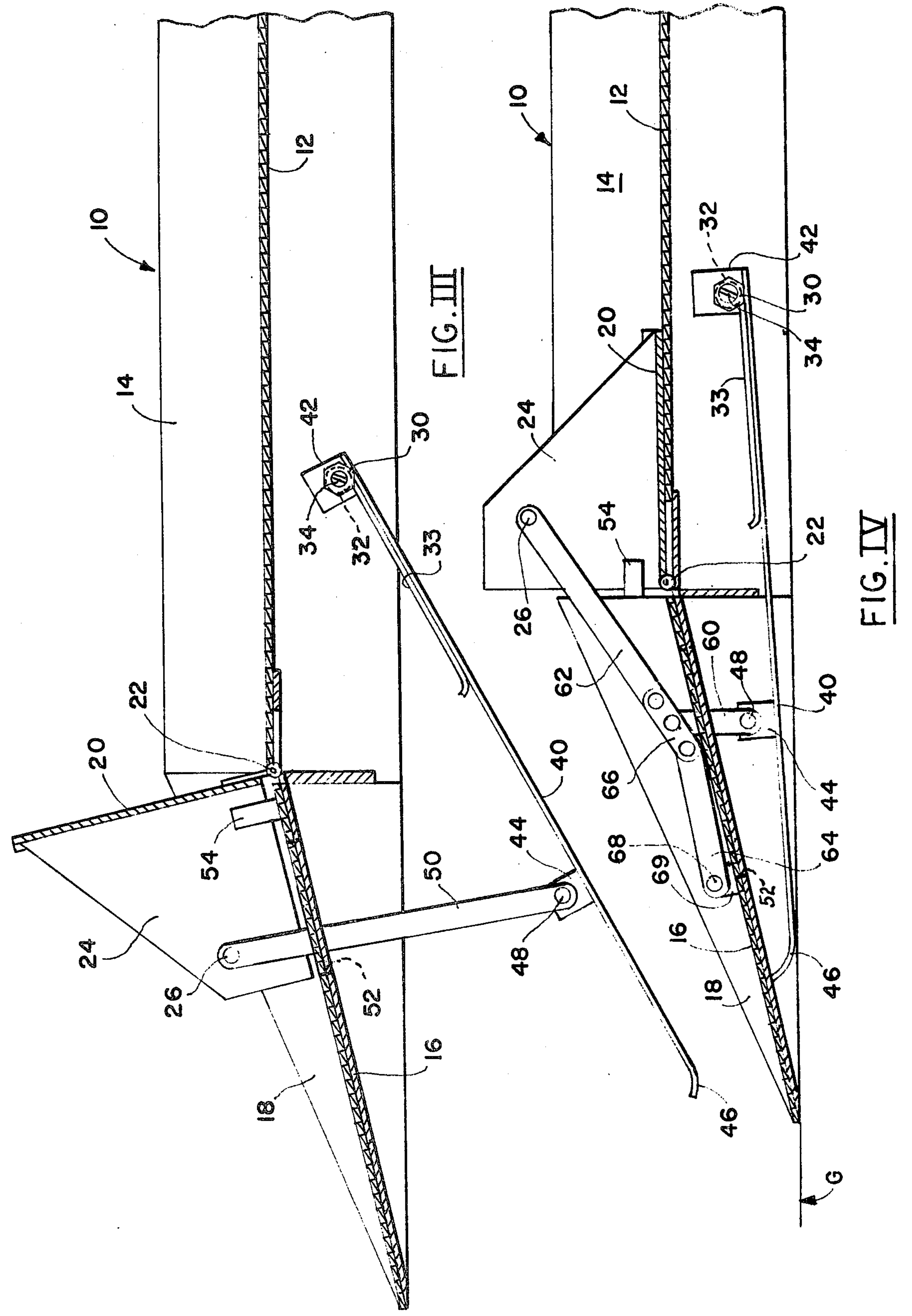
FIG. III
FIG. IV

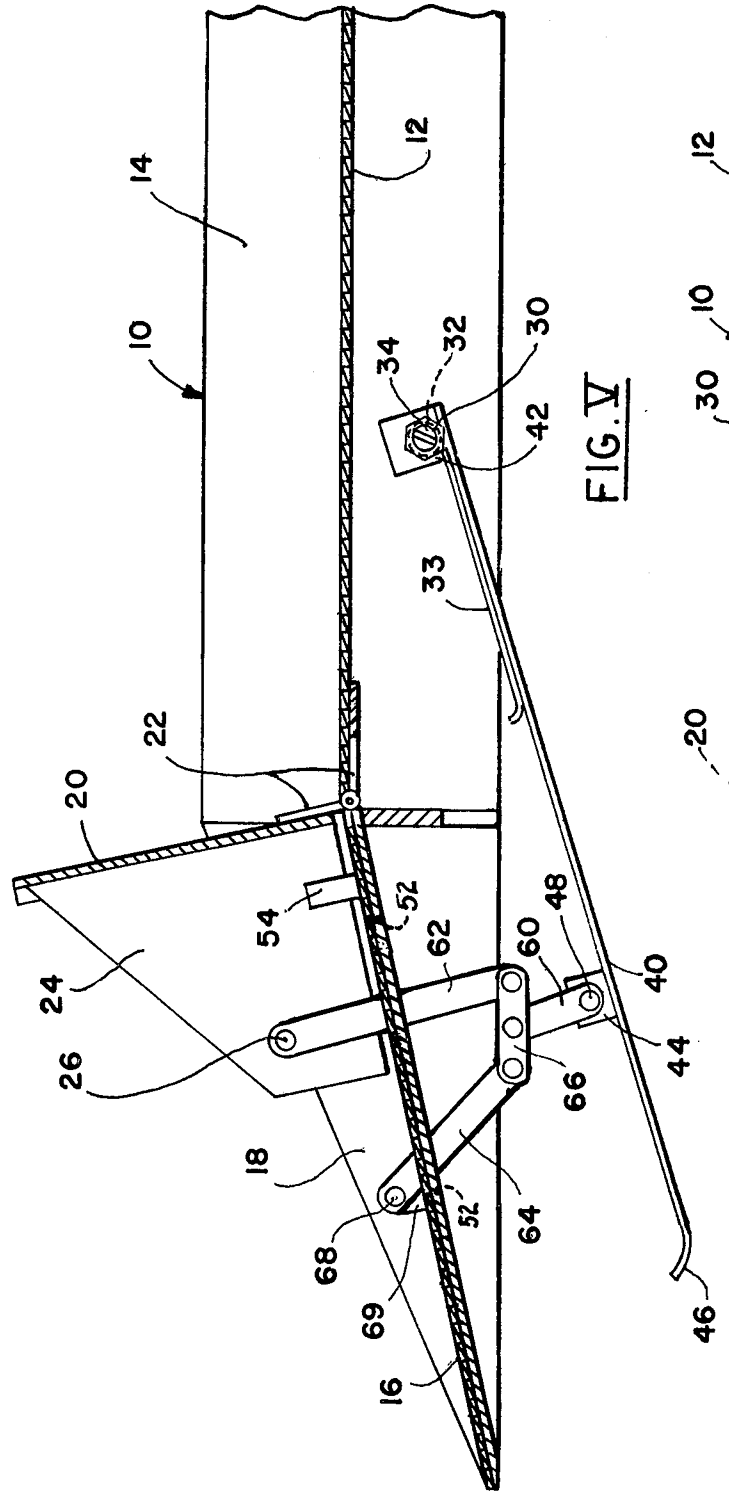
FIG. V
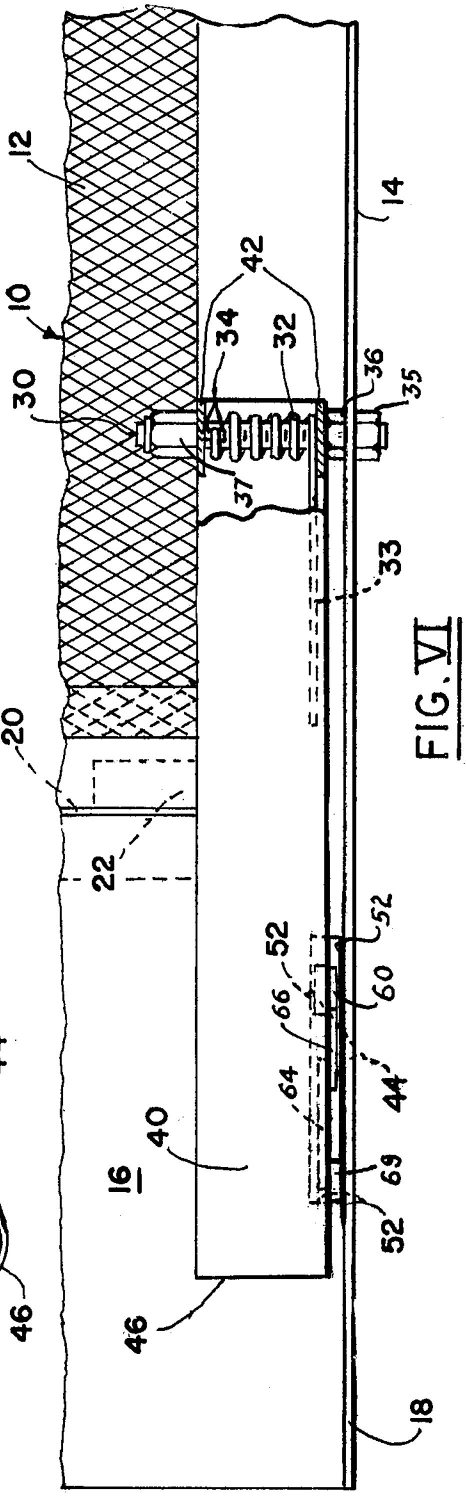
FIG. VI

LIFT PLATFORM RETAINER

BACKGROUND OF THE INVENTION

Although many lift platforms for wheeled vehicles, which platforms contain ground-engaging levers and springs urging their barriers into barrier position are well known, and most of these devices comprise complicated levers, pivots and links, none seem to have the improved simple, positive, and adjustable combination of one lever and links according to applicant's present invention.

SUMMARY OF THE INVENTION

Generally speaking, applicant's invention comprises a lift platform, such as for wheelchair lifts for vehicles, in which the platform is movable from the ground to a floor above the ground, and the open edge or side of this platform is provided with an automatically movably retainer or barrier plate hinged to the platform. This barrier plate is normally urged into its substantially vertical or barrier position as long as the platform is away from the ground, but as soon as the platform approaches the ground and a depending secondary lever under the platform engages the ground, this lever is pivoted around its end pivot or fulcrum to move upwardly and to move the barrier plate downwardly flush with the surface platform so that any wheeled vehicle can easily be rolled over the barrier plate to and from the platform. An adjustable helical spring is mounted around the pivot or fulcrum at the end of the secondary ground-engaging lever, and one or a plurality of end pivoted links are connected between the secondary ground-engaging lever and the barrier plate. Stop means are provided on the movable barrier plate for limiting further movement of the barrier plate when it reaches its barrier position substantially orthogonal to the horizontal surface of the platform.

OBJECTS AND ADVANTAGES

It is an object of this invention to produce an improved, efficient, effective, economic, simple and safe automatic barrier for platform lifts.

Another object is to produce such a barrier which is normally urged into its barrier position and the force of which urging may be easily varied or adjusted.

Still another object is to provide such a barrier which immediately on the start of its operation raises an abutting edge to any wheel that is supported on the platform, and not a ramp surface which at small angles of incline can be rolled over easily by a wheel.

A still further object is to produce a barrier plate which can be moved flush easily with the platform by the wheel of a vehicle when the platform is in its ground-engaging position, whether or not the barrier plate is completely flat on the surface of the platform.

BRIEF DESCRIPTION OF THE VIEWS IN THE DRAWINGS

The above mentioned and other features, objects and advantages, and a manner of attaining them are described more specifically below by reference to embodiments of this invention shown in the accompanying drawings wherein:

FIG. I is a vertical sectional view through the open or ramp end and barrier of one embodiment of this invention showing the platform on the ground and the barrier in full lines in its collapsed position, and in dotted lines in a position as soon as the platform is raised slightly from the ground;

FIG. II is a plan view of the edge of the platiorm shown in FIG. I with the barrier in its collapsed position;

FIG. III is a sectional view similar to FIG. I showing the platform raised from the ground and the barrier in its barrier position;

FIG. IV is a vertical sectional view of a lift platform similar to that shown in FIG. I, but of another embodiment of the barrier operating links between the barrier and the secondary ground-engaging lever;

FIG. V is a view similar to FIG. III but of the embodiment in FIG. V showing the position of the barrier and its operating lever and links when the platform is away from the ground;

FIG. VI is a view looking under the platform at the ground-engaging lever with a part broken away in the position shown in FIG. V.

DETAILED DESCRIPTION OF THE PREFERRED EMBODIMENTS

In each of the views there is shown a side of a wheelchair lift platform 10 which may comprise an expandable mesh or screen horizontal supporting surface 12 and a side rib or edge 14 which may comprise a metal bar of "T" cross-section, the leg of which "T" provides a horizontal flange to which the edge of the metal mat or mesh 12 may be welded and by which said mesh is supported. Along the front or outer edge of this platform there is also shown herein a ramp 16 which is shown herein to be welded to the edge of the platform and forms an incline between the surface of the mat or mesh 12 and the ground G on which the platform rests as shown in FIGS. I and IV. The opposite ends of this ramp also may be provided with flanged sides 18 which extend the vertical flanges of the T-section 14 to a point at the front edge of the ramp 16.

Hinged along the front edge of the platform 12 at the top of the ramp 16 is a longitudinal barrier plate or retainer 20 fastened at a plurality of intervals along its lower edge by means of hinges 22 to the platform 12, the leaves of which hinges may be welded respectively to the edge of the platform 12 and adjacent edge of barrier plate 20. At at least one and preferably both ends of the barrier plate 20 there is provided an orthogonal end flange 24 to which the pivoted link mechanisms of both embodiments of this invention are pivotally connected at 26.

Below the platform 12 and anchored to the lower flange of the T-section side rail 14 near the front edge of the platform is a bolt 30 for pivoting the end of a ground-engaging lever 40 which is normally urged into its downward position shown in FIGS. III, V and VI by means of a helical spring 32, one end 33 of which spring may engage the upper side of the lever 40, and the other end of which spring 32 may be mounted in a slot 34 in the inner end of the bolt 30. This threaded stud or bolt 30 may be provided with a pair of nuts 35 and 36 for locking the rotation of the bolt or stud 30 in the side flange 14 of the platform 10, when the torsion in the spring 32 has been properly adjusted by rotation of the bolt, such as by a screwdriver in the slot 34. The inner end of the bolt or stud 30 may be provided with a locknut 37 for holding the spring on the bolt and also the aligned apertured flanges 42 for pivoting the end of the secondary ground-engaging lever 40 on the bolt 30.

Thus the engagement of the outer free end of the lever 40 with the ground, as shown in FIGS. I and IV, the lever 40 acts as a secondclass lever against the action of the end 33 of the spring 32, and when the platform is away from the ground, the end of the spring 33 acts as a thirdclass lever to operate and maintain the barrier 20 in its barrier position as shown in FIGS. III, V and VI.

The linkage mechanisms of the two embodiments of this invention are connected to an additional flange 44 on the side of the lever 40 between its outer end 46 that engages the ground and its pivoted end flanges 42. This flange 44 is provided with an aperture for a pivot 48 of one end of the link mechanisms.

Referring now to the embodiment of the link mechanism shown in FIGS. I through III, there is provided a single link 50 pivoted at each end, one end to the lever 40 via flange 44 by the pivot 48 and the other end to the pivot 26 in the flange 24 of the barrier 20. This single link 50 extends through a slot 52 provided therefor in the ramp 16. In this embodiment, the limiting of the upward or barrier position movement of the barrier 20 may be by a stop 54 contacting the surface of the ramp 16 (see FIG. III), which stop 54 may be welded to the flange 24 of the barrier plate 20. Thus when the lever 40 has its end 46 in engagement with the ground G as shown in FIG. I, such is against the action of the spring 32 and its end 33 by moving the lever 50 into the position shown in FIG. I to rotate the barrier 20 about its hinges 22 so that its back surface lies substantially flush with the surface 12 of the platform 10 and so that a wheel W of a vehicle can easily ride up the ramp 16 onto the platform, and vice versa. However, as soon as the platform 10 raises slightly above the ground, the end 33 of the spring 32 moves the lever 40 into the dotted-line position 40' shown in FIG. I, which simultaneously moves the barrier plate 20 into its dotted-line position 20' presenting a bumper stop edge to the wheel W on the platform. As the platform is completely raised above the ground so that the end 46 of the lever 40 is no longer in contact with the ground G as shown in FIG. III, the barrier plate 20 moves into a substantially orthogonal position to the surface 12 of the platform 10 and is stopped in this position by abutment of the outer end of the stop 54 against the outer edge of the ramp 16, so as to maintain this barrier position and prevent the rolling of any wheels off this end of the platform 10 as long as the platform 10 is away from or above the ground G.

Referring now to the link means of the embodiment shown in FIGS. IV, V and VI, a plurality of links are employed, namely links 60, 62, 64 and 66, all pivoted at their ends to another link except intermediate link 66 which is also pivoted in its center to the link 60, the other or outer end of which link 60 is pivoted to the flange 48 on the lever 40. The link 62 is pivoted at one end to one end of the intermediate link 66 and at its other outer end to pivot 26 on the end flange 24 of the barrier plate 20. The additional link 64 is pivoted at its inner end to the other end of the intermediate link 66 and at its outer other end link 64 is pivoted at 68 to a flange 69 mounted on the ramp 16. The advantage of this plurality of links and pivots is that in the event the platform is not lowered on level ground so that the lever 40 is not in the position shown in FIG. IV, but may be in a position as shown in dotted lines at 20' in FIG. I, then the barrier plate 20 would not be in its full-line position shown in FIG. IV; however, a wheeled vehicle still could ride up on the ramp 16 and over the barrier plate 20 without causing a bump because the extra pivoted links permit the ramp 20 to be pressed into the full-line position shown in FIG. IV by the vehicle wheel which could ride over the barrier plate 20 from either direction, going on to or coming off of the platform surface 12. This additional toggle flexibility of the levers 60 through 66 compensates for any relatively small irregularities in the ground G which may occur, and insures smoother operation of the barrier mechanism of this invention. The upper or barrier position of the barrier plate 20 as shown in FIG. V may be limited by the stop means 54, as shown and described above in the embodiment of FIGS. I through III.

It is to be understood that the shape, length and location of the operative links may be varied as required without departing from the scope of this invention, and that the parts may be made out of other materials than metal as desired.

While there is described above the principles of this invention in connection with specific apparatus, it is to be clearly understood that this description is made only by way of example and not as a limitation to the scope of this invention.

I claim:

1. A lift platform having a barrier plate hinged along the outer edge of the platform, said barrier plate movable from a position flush with the top surface of the platform to a position substantially orthogonal thereto, said barrier plate having an upwardly extending orthogonal flange at one end thereof and a slot in said platform adjacent said flange, a ground-engaging lever pivoted at one end to said platform near said barrier plate, link means extending through said slot and pivoted to a point between the ends of said lever and to said end flange, and an adjustable helical spring means around said pivot of said lever to said platform for urging said lever downward from said platform and for urging said barrier plate into its upward orthogonal barrier position from the top surface of said platform, said ground-engaging lever moving said barrier plate into its nonbarrier position flush with the upper surface of said platform against the action of said spring when said ground-engaging lever is in contact with the ground and said platform rests on the ground.

2. A lift platform barrier plate according to claim 1 including a stop means for limiting the orthogonal barrier position.

3. A lift platform barrier plate according to claim 2 wherein said stop means is attached to said orthogonal flange at one end of said barrier plate.

4. A lift platform barrier plate according to claim 1 wherein said link means comprises a single link between said orthogonal flange on said barrier plate and said ground-engaging lever.

5. A lift platform barrier plate according to claim 1 wherein said helical spring means has a tangentially extending end engaging said ground-engaging lever and a diametrically extending other end anchored to said pivot.

6. A lift platform barrier plate according to claim 5 wherein said pivot for said ground-engaging lever comprises a diametrically slotted bolt means and said other end of said spring is anchored in the slot of said bolt means.

7. A lift platform having a barrier plate hinged along the outer edge of the platform, said barrier plate movable from a position flush with the top surface of the platform to a position substantially orthogonal thereto, said barrier plate having an upwardly extending orthogonal flange at one end thereof and a slot in said platform adjacent said flange, said flange including a stop means for limiting its orthogonal barrier position, a ground-engaging lever pivoted at one end to said platform near said barrier plate, a single link means extending through said slot and pivoted at its ends to a point between the ends of said lever and to said end flange, and an adjustable helical spring means around said pivot of said lever to said platform for urging said lever downward from said platform and for urging said barrier plate into its upper orthogonal barrier position from the top surface of said platform, said ground-engaging lever moving said barrier plate into its non-barrier position flush with the upper surface of said platform against the action of said spring and when said ground-engaging lever is in contact with the ground and said platform rests on the ground.

8. A lift platform having a barrier plate hinged along the outer edge of the platform, said barrier plate movable from a position flush with the top surface of the platform to a position substantially orthogonal thereto, said barrier plate having an orthogonal flange at one end thereof, a ground-engaging lever pivoted at one end to said platform near said barrier plate, link means comprising four links with one link pivoted to (a) a point between the ends of said lever, a second link (b) pivoted to said end flange, a third link (c) fixedly pivoted relative to said platform, and each of said three links pivoted to a fourth floating link (d), and an adjustable spring means around said pivot of said lever to said platform for urging said lever downward from said platform and for urging said barrier plate into its upward orthogonal barrier position from the top surface of said platform, said ground-engaging lever moving said barrier plate into its non-barrier position flush with the upper surface of said platform against the action of said spring when said ground-engaging lever is in contact with the ground and said platform rests on the ground.

9. A platform barrier plate according to claim 8 including stop means for limiting the orthogonal barrier position of said barrier plate.

10. A lift platform barrier plate according to claim 8 wherein said helical spring means has a tangentially extending end engaging said ground-engaging lever and a diametrically extending other end anchored to said pivot.

11. A lift platform barrier plate according to claim 10 wherein said pivot for said ground-engaging lever comprises a diametrically slotted bolt means and said other end of said spring is anchored in the slot of said bolt means.

12. A lift platform having a barrier plate hinged along the outer edge of the platform, said barrier plate movable from a position flush with the top surface of the platform to a position substantially orthogonal thereto, said barrier plate having an orthogonal flange at one end thereof, a ground-engaging lever pivoted at one end to said platform near said barrier plate, link means pivoted to a point between the ends of said lever and to said end flange, said link means comprising a plurality of links pivoted at their ends, one to each of said ground-engaging levers, said orthogonal flange on said barrier, and said platform, and their other ends are separately pivotally attached to a fourth and intermediate link, and an adjustable helical spring means around said pivot of said lever to said platform for urging said lever downward from said platform and for urging said barrier plate into its upward orthogonal barrier position from the top surface of said platform, said ground-engaging lever moving said barrier plate into its non-barrier position flush with the upper surface of said platform against the action of said spring when said ground-engaging lever is in contact with the ground and said platform rests on the ground.

* * * * *